(12) United States Patent
Timothy et al.

(10) Patent No.: US 7,987,421 B1
(45) Date of Patent: Jul. 26, 2011

(54) METHOD AND APPARATUS TO DYNAMICALLY PROVIDE WEB CONTENT RESOURCES IN A PORTAL

(76) Inventors: Boyd H Timothy, Provo, UT (US); Olin Sayre Atkinson, Orem, UT (US); Christopher Jean Seiler, Pleasant Grove, UT (US); Matthew Gerrit Brooks, Orem, UT (US); Shawn Matthew Holmstead, Lehi, UT (US); John Ransom VanOrman, II, Lindon, UT (US); James Mark Norman, Pleasant Grove, UT (US)

( * ) Notice: Subject to any disclaimer, the term of this patent is extended or adjusted under 35 U.S.C. 154(b) by 1714 days.

(21) Appl. No.: 10/066,465

(22) Filed: Jan. 30, 2002

(51) Int. Cl.
*G06F 17/00* (2006.01)
(52) U.S. Cl. ......................... 715/243; 715/264
(58) Field of Classification Search .................. 715/517, 715/536, 243, 264, 234, 235, 238; 707/536
See application file for complete search history.

(56) References Cited

U.S. PATENT DOCUMENTS

| | | | |
|---|---|---|---|
| 5,603,034 A | 2/1997 | Swanson | |
| 5,717,923 A | 2/1998 | Dedrick | |
| 5,778,380 A * | 7/1998 | Siefert | 707/103 R |
| 5,797,128 A | 8/1998 | Birnbaum | |
| 5,983,227 A | 11/1999 | Nazem et al. | |
| 6,029,245 A | 2/2000 | Scanlan | |
| 6,061,684 A | 5/2000 | Glasser et al. | |
| 6,119,078 A * | 9/2000 | Kobayakawa et al. | 704/3 |
| 6,202,066 B1 | 3/2001 | Barkley et al. | |
| 6,209,036 B1 | 3/2001 | Aldred et al. | |
| 6,209,124 B1 | 3/2001 | Vermeire et al. | |
| 6,240,170 B1 | 5/2001 | Shaffer et al. | |
| 6,243,717 B1 | 6/2001 | Gordon et al. | |
| 6,285,978 B1 * | 9/2001 | Bernth et al. | 704/7 |
| 6,286,001 B1 | 9/2001 | Walker et al. | |
| 6,311,180 B1 | 10/2001 | Fogarty | |
| 6,327,628 B1 | 12/2001 | Anuff et al. | |
| 6,363,337 B1 * | 3/2002 | Amith | 704/7 |
| 6,370,498 B1 * | 4/2002 | Flores et al. | 704/3 |
| 6,381,579 B1 * | 4/2002 | Gervais et al. | 705/8 |
| 6,389,589 B1 | 5/2002 | Mishra et al. | |
| 6,408,336 B1 | 6/2002 | Schneider et al. | |
| 6,415,250 B1 | 7/2002 | Van Den Akker | |
| 6,499,030 B1 | 12/2002 | Igata | |
| 6,529,910 B1 | 3/2003 | Fleskes | |
| 6,542,884 B1 | 4/2003 | Soderberg et al. | |

(Continued)

FOREIGN PATENT DOCUMENTS

EP 0 975 128 A1 1/2000

(Continued)

OTHER PUBLICATIONS

Systran Enterprise Products page, 2004, Systran, pp. 1-3.*

(Continued)

*Primary Examiner* — Stephen Hong
*Assistant Examiner* — Manglesh Patel
(74) *Attorney, Agent, or Firm* — Marger Johnson & McCollom, P.C.

(57) ABSTRACT

To display content in a user's preferred language, a content provider locates a layout information file to determine how to display the content. A layout strings file storing a layout string in a specific language is selected, according to the user's preferred languages. The content from a content provider and the layout string are then formatted as specified by the layout information file, and presented to the user.

38 Claims, 13 Drawing Sheets

U.S. PATENT DOCUMENTS

| | | | |
|---|---|---|---|
| 6,557,005 B1* | 4/2003 | Burget | 707/102 |
| 6,560,639 B1 | 5/2003 | Dan et al. | |
| 6,571,241 B1 | 5/2003 | Nosohara | |
| 6,623,529 B1* | 9/2003 | Lakritz | 715/536 |
| 6,633,742 B1 | 10/2003 | Turner et al. | |
| 6,644,322 B2* | 11/2003 | Webb | 128/899 |
| 6,704,024 B2 | 3/2004 | Robotham et al. | |
| 6,708,172 B1 | 3/2004 | Wong et al. | |
| 6,738,950 B1 | 5/2004 | Barnett | |
| 6,772,146 B2 | 8/2004 | Khemlani et al. | |
| 6,784,883 B1 | 8/2004 | Allor | |
| 6,785,728 B1 | 8/2004 | Schneider et al. | |
| 6,785,866 B1* | 8/2004 | Lewis et al. | 715/209 |
| 6,789,231 B1 | 9/2004 | Reynar et al. | |
| 6,826,594 B1* | 11/2004 | Pettersen | 709/203 |
| 6,871,197 B1 | 3/2005 | Johnson | |
| 6,901,367 B1* | 5/2005 | Berstis et al. | 704/277 |
| 6,925,595 B1 | 8/2005 | Whitledge et al. | |
| 6,925,598 B2 | 8/2005 | Melham et al. | |
| 6,941,512 B2* | 9/2005 | Cheng | 715/239 |
| 6,965,914 B2 | 11/2005 | Dowling | |
| 6,975,619 B1 | 12/2005 | Byers et al. | |
| 6,993,554 B2 | 1/2006 | O'Donnell | |
| 7,016,977 B1* | 3/2006 | Dunsmoir et al. | 709/246 |
| 7,085,834 B2 | 8/2006 | Delany et al. | |
| 7,093,198 B1* | 8/2006 | Paatero et al. | 715/746 |
| 7,111,242 B1* | 9/2006 | Grooters | 715/744 |
| 7,149,960 B1 | 12/2006 | Brooks et al. | |
| 7,149,964 B1* | 12/2006 | Cottrille et al. | 715/234 |
| 7,194,524 B2 | 3/2007 | Suzuki et al. | |
| 7,284,239 B1* | 10/2007 | Young et al. | 717/137 |
| 7,660,843 B1 | 9/2010 | Atkinson et al. | |
| 2001/0037192 A1 | 11/2001 | Shimamoto et al. | |
| 2002/0002557 A1 | 1/2002 | Straube et al. | |
| 2002/0007330 A1 | 1/2002 | Kumar et al. | |
| 2002/0019839 A1* | 2/2002 | Shiu | 707/536 |
| 2002/0046245 A1 | 4/2002 | Hillar et al. | |
| 2002/0052954 A1 | 5/2002 | Polizzi et al. | |
| 2002/0055989 A1 | 5/2002 | Stringer-Calvert et al. | |
| 2002/0069081 A1 | 6/2002 | Ingram et al. | |
| 2002/0078253 A1* | 6/2002 | Szondy et al. | 709/315 |
| 2002/0103778 A1 | 8/2002 | Saxena | |
| 2002/0120538 A1 | 8/2002 | Corrie et al. | |
| 2002/0123879 A1* | 9/2002 | Spector | 704/2 |
| 2002/0129001 A1 | 9/2002 | Levkoff et al. | |
| 2002/0129052 A1 | 9/2002 | Glazer et al. | |
| 2002/0138331 A1 | 9/2002 | Hosea et al. | |
| 2002/0143821 A1* | 10/2002 | Jakubowski | 707/522 |
| 2002/0147790 A1 | 10/2002 | Snow | |
| 2002/0147801 A1 | 10/2002 | Gullotta et al. | |
| 2002/0149601 A1 | 10/2002 | Rajarajan et al. | |
| 2002/0156902 A1 | 10/2002 | Crandall | |
| 2002/0174150 A1* | 11/2002 | Dang et al. | 707/536 |
| 2002/0174196 A1 | 11/2002 | Donohoe et al. | |
| 2002/0184321 A1 | 12/2002 | Fishman et al. | |
| 2002/0198971 A1 | 12/2002 | Resnick et al. | |
| 2003/0005002 A1 | 1/2003 | Chen et al. | |
| 2003/0005159 A1* | 1/2003 | Kumhyr | 709/246 |
| 2003/0020749 A1 | 1/2003 | Abu-Hakima et al. | |
| 2003/0050986 A1 | 3/2003 | Matthews et al. | 709/206 |
| 2003/0061216 A1 | 3/2003 | Moses | |
| 2003/0105771 A1 | 6/2003 | Tiefenbrun et al. | |
| 2003/0110272 A1 | 6/2003 | du Castel et al. | |
| 2003/0158897 A1 | 8/2003 | Ben-Natan et al. | |
| 2003/0163517 A1 | 8/2003 | Assaf et al. | |
| 2003/0191817 A1* | 10/2003 | Fidler | 709/219 |
| 2003/0195923 A1* | 10/2003 | Bloch et al. | 709/203 |
| 2004/0034613 A1* | 2/2004 | Purvis et al. | 707/1 |
| 2004/0093376 A1 | 5/2004 | DeBoor et al. | |
| 2004/0098406 A1 | 5/2004 | Roddy | |
| 2004/0123238 A1 | 6/2004 | Hefetz et al. | |
| 2004/0172389 A1 | 9/2004 | Galai et al. | |
| 2004/0177015 A1 | 9/2004 | Galai et al. | |
| 2004/0193699 A1 | 9/2004 | Heymann et al. | |
| 2004/0199603 A1 | 10/2004 | Tafla et al. | |
| 2004/0205118 A1 | 10/2004 | Yu | |
| 2004/0205553 A1 | 10/2004 | Hall et al. | |
| 2004/0205572 A1 | 10/2004 | Fields et al. | |
| 2004/0215740 A1 | 10/2004 | Frank et al. | |
| 2005/0055630 A1* | 3/2005 | Scanlan | 715/513 |
| 2005/0060046 A1* | 3/2005 | Ito et al. | 700/17 |
| 2005/0097008 A1 | 5/2005 | Ehring et al. | |
| 2005/0097190 A1 | 5/2005 | Abdelhak | |
| 2005/0188318 A1 | 8/2005 | Tamir et al. | |
| 2006/0004763 A1 | 1/2006 | Horvitz et al. | |
| 2006/0010390 A1 | 1/2006 | Guido et al. | |
| 2006/0101332 A1 | 5/2006 | Imielinski et al. | |
| 2007/0180432 A1 | 8/2007 | Gassner et al. | |
| 2008/0300863 A1* | 12/2008 | Smith | 704/9 |

FOREIGN PATENT DOCUMENTS

WO    WO98/20434    5/1998

OTHER PUBLICATIONS

Wugofski et al., CSS Mobile Profile 1.0, Oct. 24, 2001, W3C, pp. 1-15.*
Wugofski, CSS Mobile Profile 1.0, Oct. 2000, W3C, pp. 1-15.*
"Portal Building Guide"; Yahoo! PortalBuilder TM; Nov. 2001; Software Release 3.5.0.
Blount Sumner, "Secure Portal Management"; eAI Journal; May 2000; pp. 44, 46, 48 & 49.
King, Bob; "All Together Now"; Internet World; Aug. 15, 2000; pp. 38-39.

* cited by examiner

METHOD AND APPARATUS TO DYNAMICALLY PROVIDE WEB CONTENT RESOURCES IN A PORTAL

RELATED APPLICATION DATA

This application is related to U.S. patent application Ser. No. 10/066,368, titled "Method to Dynamically Determine a User's Language for the Internet," filed Jan. 30, 2002.

FIELD OF THE INVENTION

This invention pertains to network access, and more particularly to accessing content over a network in a format preferred by the user.

BACKGROUND OF THE INVENTION

The Internet has become a resource of incredible power for many people. The ability to locate information on almost any subject, simply by using a computer, has made possible whole new avenues of research. Users can locate information on their subject of choice almost as simply as by asking a question.

But language issues complicate the use of the Internet. Although English is currently the dominant language of the Internet, it is by no means the only language available. Content pages exist in just about every written language on the face of the planet.

Since there are very few people who can read every written language, different language versions of content pages can be provided. Thus, for example, a person who is comfortable communicating in English can view a content page written in English, whereas a Japanese native can view a content page prepared in Japanese.

The original way users specified the language in which they viewed material was by knowing the uniform resource locator (URL) of the content site written in that language. Thus, for example, if a site provided a content page in both English and Japanese formats, the user had to know the URL of the English content page to view the page in English, or the URL of the Japanese content page to view the page in Japanese.

FIG. 1 shows a prior art system for accessing information in a preferred language. In FIG. 1, a user is using computer system 105 to access network 110. Computer system 105 includes the standard components of a computer system: computer (including a processor, memory, etc.), monitor, keyboard, and mouse, but a person skilled in the art will recognize other variations that can be substituted for computer system 105 (e.g., a dumb terminal). Across network 110 is server 115, storing content page 120. When the user enters the URL of content page 120 into address field 125 of browser 130, the content page is shown in browser 130 (displayed on the monitor of computer system 105). Note that in FIG. 1, the user has entered "http:##www.website.com#webpage_EN.html" as the content page. (Slashes ("/") have been replaced in the URLs of FIG. 1 with pound signs ("#") to avoid hyperlink concerns in this text.) The use of "_EN" as part of the URL lets the user know that the content page is written in English. If the user wanted to see the content page in Japanese, the user could enter "http:##www.website.com#webpage_JP.html" instead ("_JP" specifying the Japanese-language version of the content page). (There is no required format for the names for content pages: these are merely exemplary.)

But there is a significant handicap to the approach of having the user specify by URL the preferred language for display in the browser. If the user does not know the correct URL, the user cannot see the material in the preferred language.

More recently, browsers have added the capability to specify a preferred language as a setting for the browser. The user then only needs to know the URL for the main content page. Processing the URL by the browser includes sending the preferred language to the content site (as shown by arrow 135). This information is included in the header of a packet sent from the browser to the content site. Then, it becomes the responsibility of the content site to process the header information, determine the preferred language, and display the content page in the preferred language (assuming the content site includes the content page in the preferred language).

But still problems remain. Problems lie in defining the user's preferred language. Although the user does not need to specify for each content page the preferred language for display of the content page, the user still has to set the browser up to know the preferred language. This requires a manual step by the user on his computer. Further, every time the user changes computers, the browser on the new computer must be configured to know the preferred language. Finally, if the user uses a computer that is not dedicated to him (for example, the user works on a locally public machine or on machines dedicated primarily to other users), changing the preferred language would affect other users, perhaps to their displeasure (if the other users prefer a different language).

Problems also exist in displaying content to the user in the desired language. The earlier-described technique of assembling a content page with a unique URL for each different language is a straightforward solution, but has flaws. First, someone must craft a version of the content page in each possible language. The straightforward approach typically involves generating a master version of the content page in one language (e.g., English) and then translating the master version into all of the target languages. Given the number of languages that exist and the complexity of accurate translation of documents, this is by no means a simple task.

Second, when the content on the master version of the content page changes, the content on each of the translated versions must be changed to match. Again, given the number of languages and the complexity of accurate translation, this can be costly.

Third, a file naming convention, consistent across the entire network, is required. The user must know this naming convention, and must modify the URL of the content page to reflect the desired language. Conceivably, the task of modifying the URL can be shifted to the browser, but then the browser must be given specialized knowledge to know when not to modify a URL (e.g., when the user wishes to view a content page in a language other than the default). If the content provider does not conform to the file naming convention, then the user will not be able to access the content. In addition, if the content provider does not provide the content page in the language specified by the user, the user will be told that the content page does not exist, when it might exist in another language.

Accordingly, a need remains for a way to provide a content page to a user in a desired language that allows for easy content creation and update in multiple languages and saves the user or browser from having to guess at the appropriate URL for the content page, to address these and other problems associated with the prior art.

SUMMARY OF THE INVENTION

An embodiment of the invention is a method and apparatus for displaying content to a user. A layout information file is located, which specifies a form for displaying content to the user. A layout strings file is located, and combined with the layout information file to present the content according to the layout information file.

In one particular embodiment, the layout strings file stores content in a specific language.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 2:
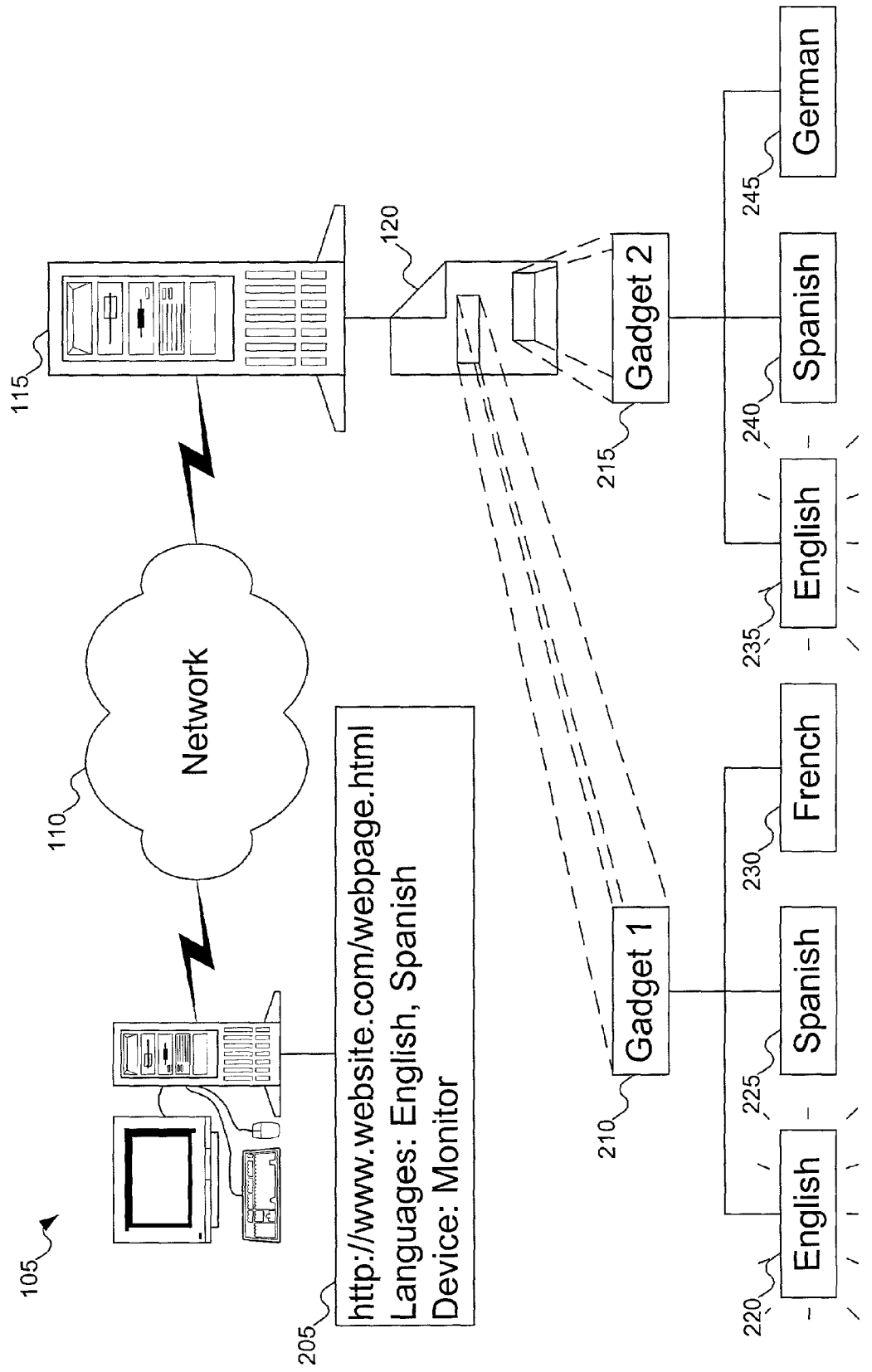
FIG. 2 shows a system to display content in a user's preferred language according to an embodiment of the invention.

FIG. 2 shows a system to display content in a user's preferred language according to an embodiment of the invention. In FIG. 2, computer system 105 transmits request 205 for a content page. Request 205 includes a site for content, and a ranked list of languages. The ranked list of languages specifies the languages the user prefers, along with an order for the preferences. For example, request 205 indicates that the user would prefer English if possible, then Spanish. (What occurs if none of the user's preferred languages are available is discussed further below with reference to FIG. 8.) A person skilled in the art will recognize that there can be more or fewer than two languages, and that any order of languages is permitted.

Figure 1:
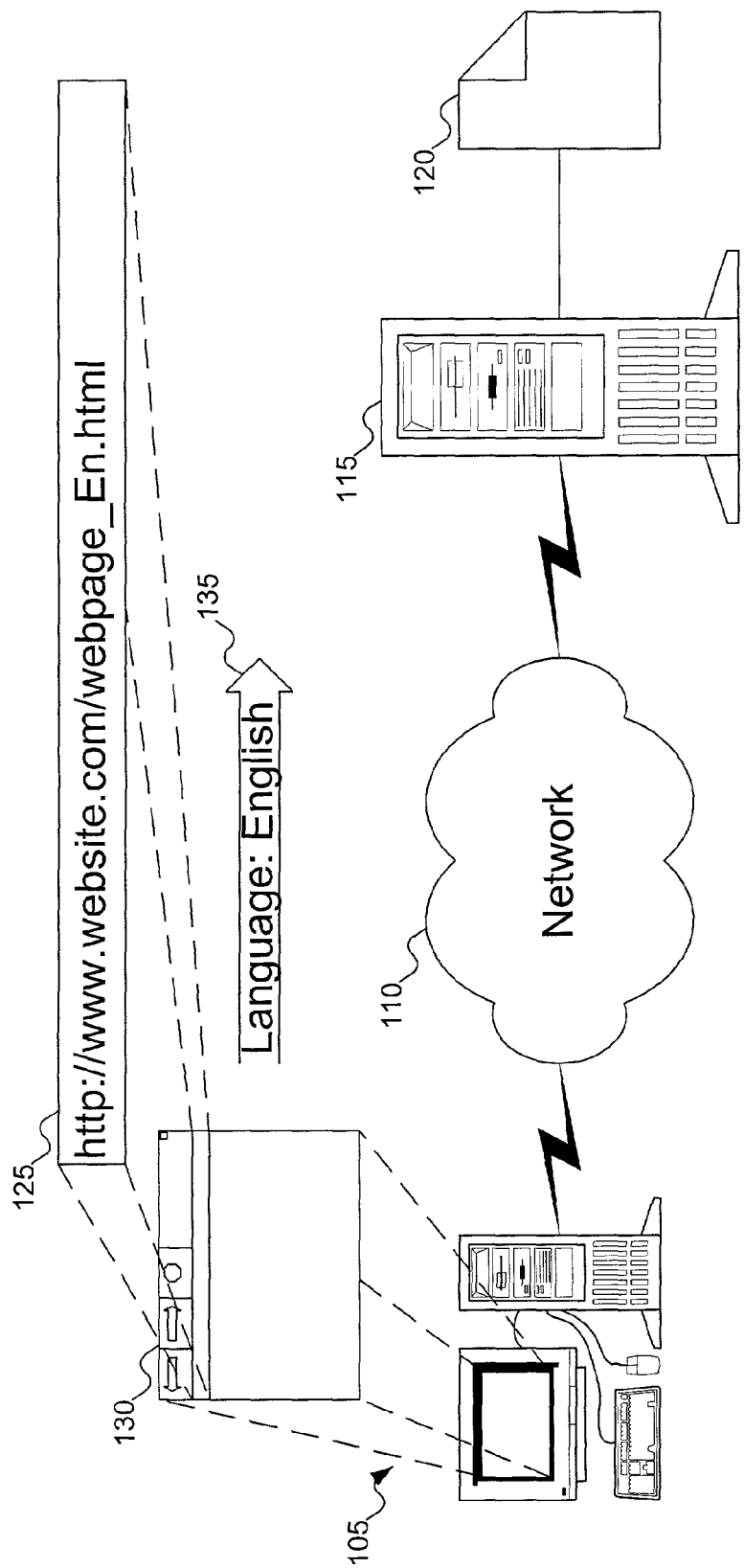
FIG. 1 shows a prior art system for accessing information in a preferred language.

Note that, in contrast to the prior art system shown in FIG. 1, request 205 of FIG. 2 specifies a generic content site. The user merely links to the standard site for the content: the user is not responsible for guessing or finding out the site for the content in a desired language. The burden is on the content provider to manage the presentation of data and to display the content in a user's preferred language, if possible.

Request 205 can specify other information for the content provider. For example, request 205 can specify the type of device on which the user is viewing the content. To specify the device on which the content is to be viewed, request 205 would indicate that the device is a standard monitor. But a person skilled in the art will recognize other types of devices: for example, portable devices.

Figure 3:
FIG. 3 shows more detail of some content displayed in the system of FIG. 2.

Content page 120 is shown with two gadgets 210 and 215. A gadget is a piece of content that can be displayed on a content page. Note that a gadget can be the entire page, or it can be only one element of the entire content page. For an example of content, consider FIG. 3. FIG. 3 shows content page 120. On content page 120 are four gadgets. Weather gadget 305 displays weather forecasts for certain cities, News gadget 310 displays some news headlines to the user, Sports gadget 315 offers links to the latest sports information, and Portfolio gadget 320 gives information about stocks and the major markets. Gadgets 305, 310, 315, and 320 are all independent, and each can be displayed on a content page independent of any of the others. In this way, the content provider can enable users to select pieces of content that are of interest, and eliminate pieces not of interest. For example, one user might only be interested in News and Portfolio, whereas another user might be interested in only Sports and Weather. Each of these sections (Weather, News, Sports, and Portfolio), if treated as gadgets, can be managed separately and combined for the user as desired. The content provider has the responsibility to combine the content from the gadgets to display to the user. Thus, the content provider is responsible for combining the content from gadgets 210 and 215 onto a single content page.

Returning to FIG. 2, each gadget can be displayed in different languages. For example, gadget 210 can be displayed in English (language 220), Spanish (language 225), and French (language 230), whereas gadget 215 can be displayed in English (language 235), Spanish (language 240), and German (language 245). A person skilled in the art will recognize that there can be fewer or more than three languages in which the gadgets can be displayed, that the gadgets need not have the same number of languages in which they can be displayed, and that there need not be any languages in common between the gadgets.

Because request 205 specified English and Spanish as the languages of choice, and both gadgets 210 and 215 support English, English languages 220 and 235 are selected (shown by the "flash" around languages 220 and 235. Note that the "flash" is simply for the reader to understand the figure, and is not actually shown directly to a user.)

Figure 4:
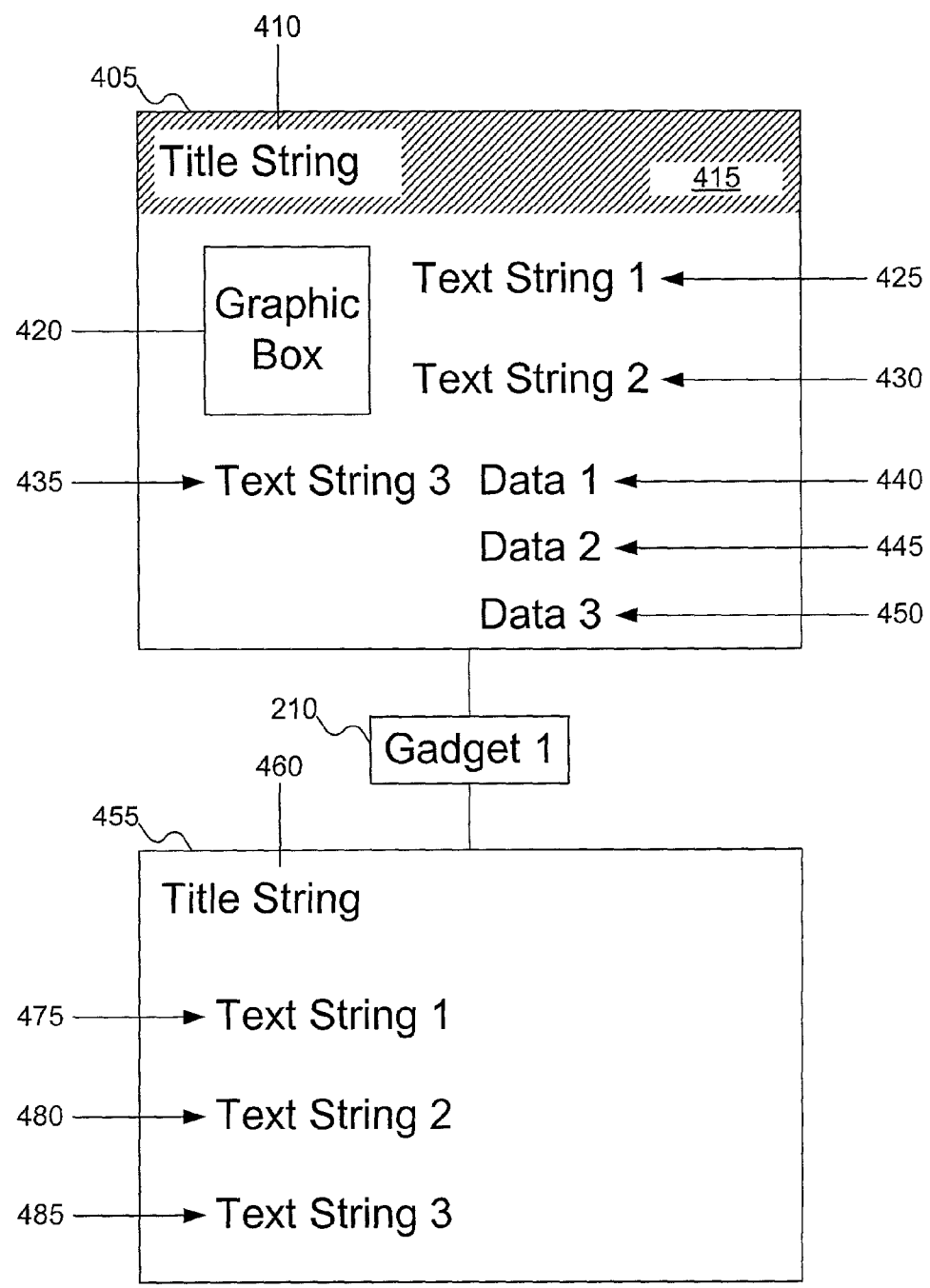
FIG. 4 shows one of the gadgets of FIG. 2 with two different layouts, according to an embodiment of the invention.

FIG. 4 shows one of the gadgets of FIG. 2 with two different layouts, according to an embodiment of the invention. In FIG. 4, layout information file (LIF) 405 specifies one layout for gadget 210, and LIF 455 specifies an alternative layout for gadget 210. (A layout information file is sometimes called a skin.) For example, LIF 405 might represent the default layout for gadget 210, whereas LIF 455 might represent a layout of gadget 210 for portable devices (where space is at a premium).

In layout information file 405, title string 410 provides a title for the gadget. For example, if gadget 210 is for Stocks, title string 410 can be "Portfolio," whereas if gadget 210 is for news, title string 410 can be "World News." Title string 410 is one example of a layout string (sometimes called a language string). Layout strings are strings that are displayed on the gadget that are language dependent. Rather than storing the string directly on the content page, LIF 405 stores a placeholder for a layout string, which can be pulled from a layout strings file for the specific language (see below with reference to FIG. 5 for more information). In that way, LIF 405 can be generally language-independent. Text strings 1 (425), 2 (430), and 3 (435) are additional examples of layout strings in LIF 405.

A person skilled in the art will recognize that there are times when LIFs can be language dependent. For example, some languages are displayed right-to-left (such as Japanese, Hebrew, or Arabic). For these languages, a LIF that has the information displayed in a different presentation can be preferable. How LIFs are associated with particular languages is discussed further with reference to FIG. 7A below.

Because content can be displayed in color, color stripe 415 can be behind title string 410. The color of color stripe 415 can be user-specified, or it can be specified by an administrator (in which case, the color is selected according to the same rules for all users). Administrator settings are discussed further below.

Graphic box 420 enables the content provider to specify graphic images that are language-specific. For example, advertisements on content pages are typically stored as images, but include text. By enabling graphic images to be language-dependent and treating graphic box 420 as a layout string, the graphic images presented to the user can also be language-dependent. In addition, graphic images can be context-dependent, as symbols can be recognized by speakers of some languages but not other languages.

Data strings 1 (440), 2 (445), and 3 (450), in contrast to text strings 1 (425), 2 430, and 3 (435), are not layout strings. Instead, data strings 1 (440), 2 (445), and 3 (450) are data that can vary depending on the time the content is displayed, and are usually language independent. For example, if LIF 405 shows, in part, stock price information, data string 1 (440), 2 (445), and 3 (450) can show the values for the Dow Jones Industrial Average, the NASDAQ, and the S&P 500. Or data strings 1 (440), 2 (445), and 3 (450) can represent the values of three particular stocks of interest to the user. A person skilled in the art will recognize other information that can be displayed in data strings 1 (440), 2 (445), and 3 (450). The values for the data strings are provided by a content provider.

Although the data strings are described above as being generally language independent, a person skilled in the art will recognize that the data strings can be localized as well. For example, the fractional portion of a decimal number is separated from the whole portion of the number by a decimal point (".") in the United States. But in other countries, a comma (",") is used. The gadget that generates the data can take advantage of the selected language to localize the data accordingly. Nevertheless, such data is not stored in a layout strings file, as the data can vary with time much more readily than the text strings.

A person skilled in the art will recognize that LIF 405 is exemplary, and not a required format. Thus, there can be more or fewer than four layout strings, nor does there have to be a title string. Data does not have to be displayed, nor do graphic images. Data can be presented in any format desired by the content provider. In short, LIF 405 merely shows one possible layout information file, of which there are nearly infinite arrangements.

For example, LIF 455 shows an alternative layout information file. LIF 455 can be for a portable device, on which display area is at a premium. Thus, although LIF 455 includes title string 460 and text strings 1 (475), 2 (480), and 3 (485), color is not used to highlight title string 460, nor are data strings 1 (440), 2 (445), and 3 (450) provided for.

Figure 5:
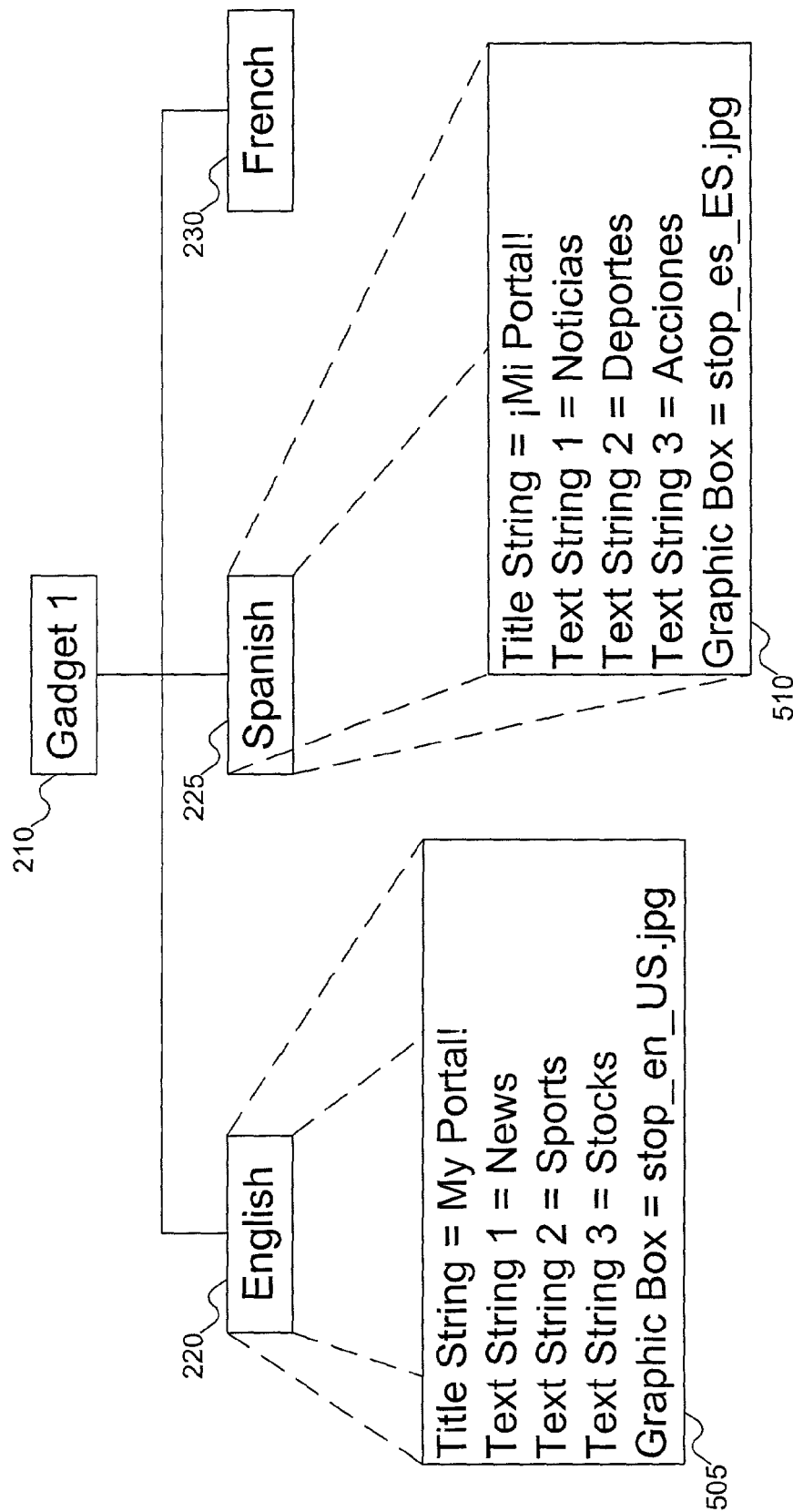
FIG. 5 shows the gadget of FIG. 4 with strings in two different languages, according to an embodiment of the invention.

FIG. 5 shows the gadget of FIG. 4 with strings in two different languages, according to an embodiment of the invention. In FIG. 5, English language 220 for gadget 210 is expanded as layout strings file 505. Layout strings file 505 shows substitution strings for the title string, text strings 1, 2, and 3, and a particular graphic image to use in a graphic box. Similarly, layout strings file 510 shows substitution strings for the title string, text strings 1, 2, and 3, and a particular graphic image to use in a graphic box for Spanish language 225. (French language 230 is not expanded for reasons of space in FIG. 5; but a person skilled in the art will recognize that similar strings in French can be placed in French language 230.)

Figure 6A:
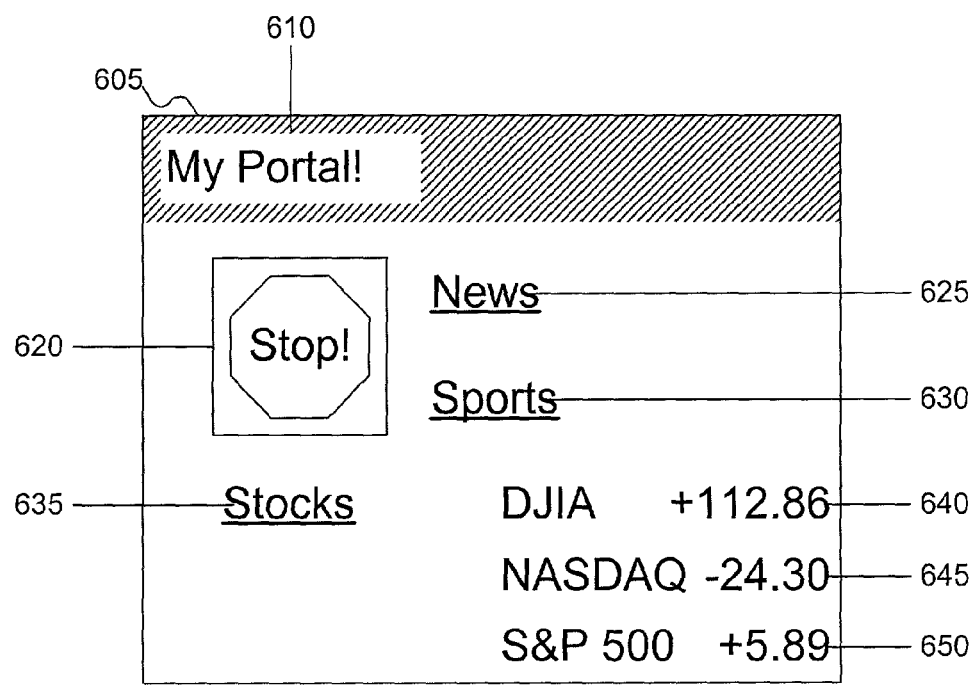
FIGS. 6A and 6B show the gadget of FIG. 4, the gadget combining one of the layouts of FIG. 4 with layout strings and images, according to an embodiment of the invention.
Figure 6B:
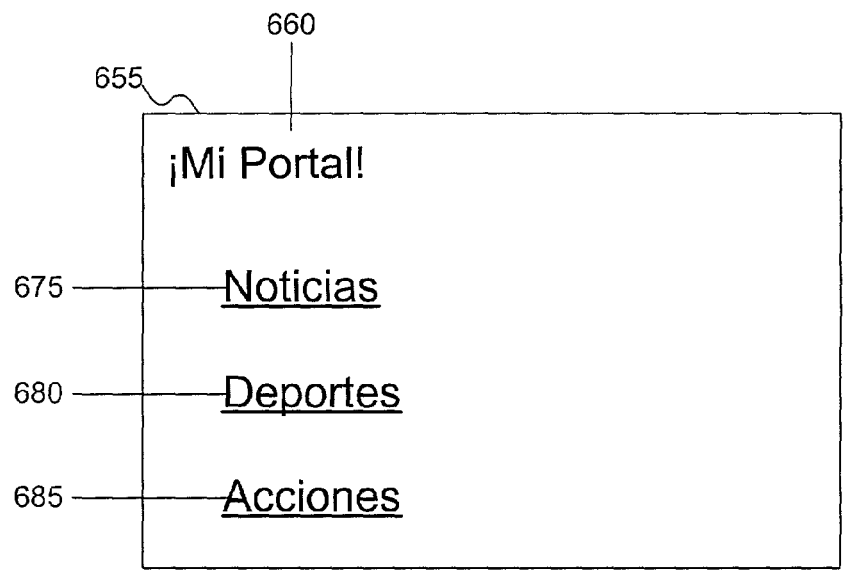

FIGS. 6A and 6B show the gadget of FIG. 4, the gadget combining one of the layouts of FIG. 4 with layout strings and images, according to an embodiment of the invention. In FIG. 6A, content page 605 shows a combination of layout 405 with English layout strings file 505. For example, title string 610 is "My Portal!", the English language title string from layout strings file 505. Similarly, text strings 625, 630, and 635 are the layout strings from expansion box 505 substituted into layout 405. And graphic image 620 is the graphic image specified in layout strings file 505.

Data strings 1 (640), 2 (645), and 3 (650) are substituted with the actual data to be displayed on the content page. As described above with reference to FIG. 4, data strings 1 (640), 2 (645), and 3 (650) are generally (but not always) independent of language. Their placement on the content page is determined by the LIF, but the data are not drawn from the layout strings files.

In contrast, FIG. 6B shows a content page generated by combining LIF 455 with Spanish layout strings file 510. Content page 655 shows the title string as "¡Mi Portal!", the Spanish language title string from layout strings file 510. Similarly, text strings 1 (675), 2 (680), and 3 (685) are drawn from layout strings file 510. Note that, although a Spanish graphic image is specified in layout strings file 510, no graphic is used in LIF 455, and so no graphic is displayed in FIG. 6B.

Figure 7A:
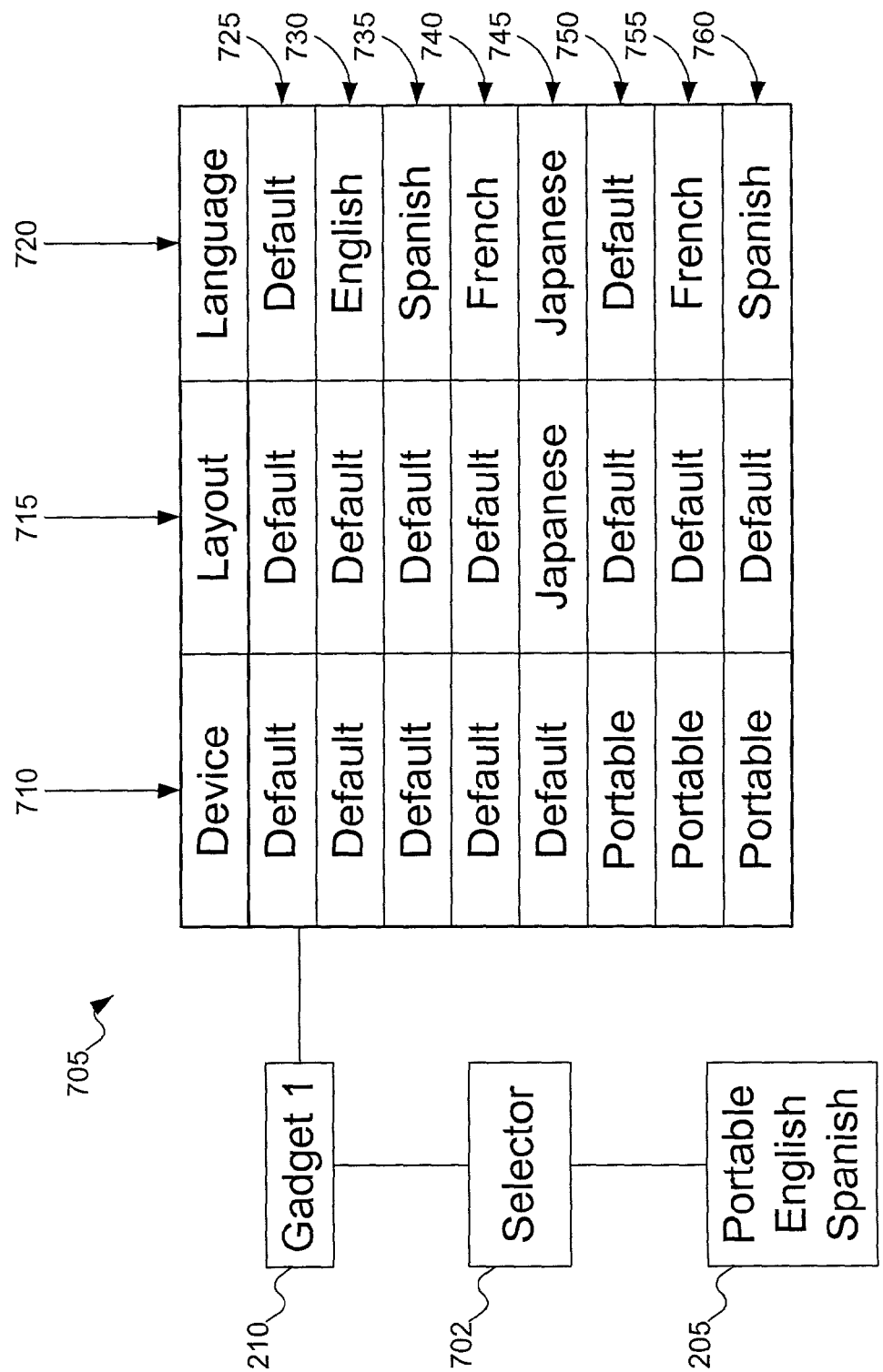
FIGS. 7A and 7B show resource file maps for the gadget of FIG. 4, according to embodiments of the invention.

FIG. 7A shows a resource file map for the gadget of FIG. 4, according to an embodiment of the invention. The resource file map is maintained on behalf of the gadget and stored with the portal system. In FIG. 7A, selector 702 combines information from request 205 (shown partially in FIG. 7A) with resource file map 705. Resource file map 705, is stored as part of gadget 210, and is built at the time the gadget is added to the portal system. Resource file map 705 lists combinations of devices, layouts, and languages. Thus, resource file map 705 has three columns: one for devices (column 710), one for layouts (column 715), and one for languages (720). In one embodiment, the resource file map includes all possible combinations of devices, layouts, and languages. This includes combinations that might never be accessed: for example, Japanese language using a Spanish layout on a default device. In a second embodiment, only valid or expected combinations of devices, languages, and layouts are included. The description below describes this second embodiment, but a person skilled in the art will recognize how the description can be modified to accommodate the first embodiment.

Each row in resource file map 705 lists a single valid combination of devices, layouts, and languages. Thus, row 725 indicates that the default device, default layout, and default language form a valid combination. Note that row 725 should be present in all resource file maps, since there needs to be a combination of devices, layouts, and languages that can be used when a more specific match cannot be found.

Rows 730-760 specify more specific combinations of devices, layouts, and languages. For example, rows 730, 735, and 740, respectively, indicate that English, Spanish, and French can be used with the default layout on the default device. Thus, if any of English, Spanish, or French is included in the ranked list of languages, the default layout can be used with the default device.

Row 745 indicates that the default device can be used with the Japanese layout and the Japanese language. Since Japanese is typically written in a right-to-left manner, a different layout can present information in a more meaningful manner to the user than the default layout (using a left-to-right presentation). Note that since there is no row in resource file map 705 using the Japanese layout for any other language, only the Japanese layout strings file is used with the Japanese layout.

Rows 750-760 indicate combinations of layouts and languages with the portable device. Specifically, row 750 indicates that the default layout for the portable device can be used with the default language. This combination ensures that when a portable device is used to display the content to the user, there is some way to display the data meaningfully for the device. If row 750 were not included in resource file map 705, then if the user indicated a preference for a language which was not mapped to any layout for the portable device, the default layout for the default device would be used (possibly with the default language, in case there is no combination of the default device with a layout compatible with the user's preferred language).

Rows 755 and 760 specify specific combinations of languages with the portable device. Note that, although Spanish and French are provided for, there is no English language specifically compatible with a LIF for the portable device in resource file map 705. If English is the default language, then a specific combination for English might not be an issue. Nevertheless, it would be preferable to include an entry for English with a LIF for the portable device, so that users with multiple language preferences get English if that is preferred over other languages (for which entries in resource file map 705 exist).

Selector 702 operates by first determining the type of device and the user's ranked list of languages from request 205. Specifically, selector 702 finds the combination of device, layout, and language that best fits the user's device and language preferences. In FIG. 7A, request 205 is presumed to include an indication that the device is a portable device, and that the user's preferred languages, in order of preference, are English and Spanish. Using this information, selector 702 checks resource file map 705 to see if there is a LIF operable on a portable device that uses either English or Spanish. As can be seen from row 760, gadget 210 supports the use of the default LIF for portable devices in Spanish (but not English). Thus, the content is to be presented to the user using the default LIF for portable devices, in Spanish.

What if row 760 were not in resource file map 705? Then there would be two choices for the closest match to the parameters of request 205. Specifically, the default language and default LIF can be used for portable devices, or the English language can be used with the default LIF for the default device. (Note that the use of Spanish with the default LIF on the default device is preempted by the user's preference of English over Spanish.) In one embodiment, the user's language preference is considered more important, and thus the default LIF for the default device is used with the user's preferred language. In another embodiment, the device is considered more important, and thus the default LIF for the portable device is used with the default language. Whether language support or device support is preferred in this situation can be decided when the gadget is implemented, or can be decided at the server level.

Sometimes, different LIFs can be provided to present content in the same language(s) on the same device(s). For example, gadget 210 might include a different LIF to present the content in English on the default device. The different LIF might simply provide an alternative presentation of data, and not be designed to support a language not otherwise supported by the default LIF. In this situation, request 205 can also specify the desired LIF.

Although FIG. 7A shows resource file map 705 including all three columns for device (column 710), layout (column 715), and language (column 720), a person skilled in the art will recognize that not all three columns need be present at all times. For example, if no layouts are designed for specific devices, then device column 710 can be removed. Similarly, if there is only one layout for each device, then layout column 715 can be removed.

Figure 7B:
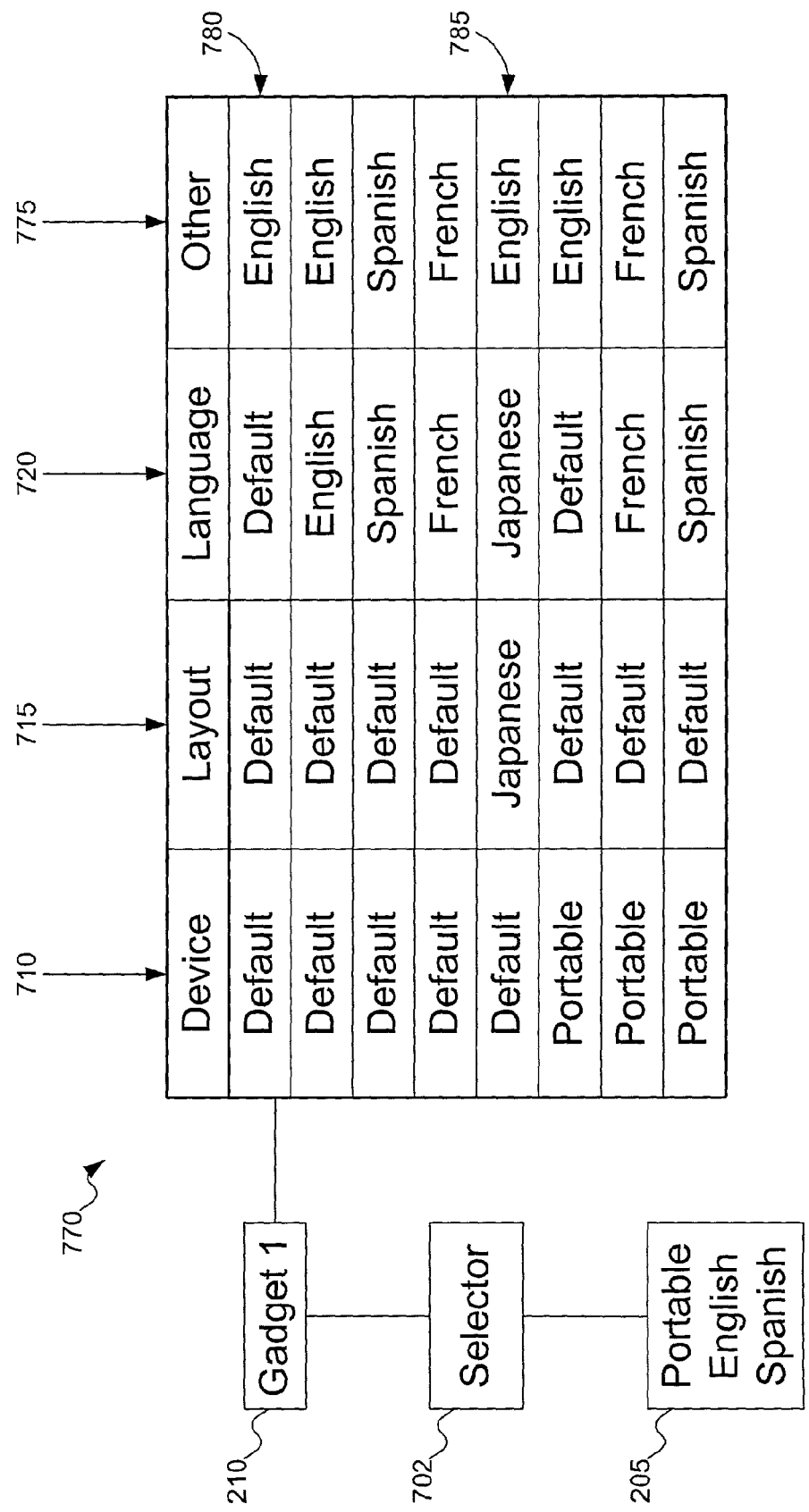

In addition to not necessarily having all of columns 710, 715, and 720 as shown in FIG. 7A, resource file map 705 can identify other resources that are context dependent for the gadget. For example, consider a gadget that displays to a user a long textual document. Although layout strings files could be used to store the text, for lengthy text files this is not the most efficient way to store the text. Another way to store the text would be in a text file. Since text is language dependent, there can be a different text file for each language. As such, the text file has been translated into English, French, and Spanish. FIG. 7B shows this situation. In FIG. 7B, resource file map 770 includes additional column 775. Column 775 identifies which text file to use in presenting the lengthy text to the user. Note that row 780 identifies that for the default entry in resource file map 770, the English language version of the text file is to be used. Note also that row 785, which indicates that a Japanese layout information file and Japanese-language layout strings file can be used for the default device, identifies the English-language version of the text file, indicating that a Japanese-language translation of the text file is not available.

Although FIG. 7B is described with reference to a text file, a person skilled in the art will recognize that resource file map 770 can identify any type of content-dependent resources, not just text files. For example, the resource file map can be used to identify the appropriate image file, provided as data by the gadget (as opposed to being localized), to use for a particular layout.

Figure 8:
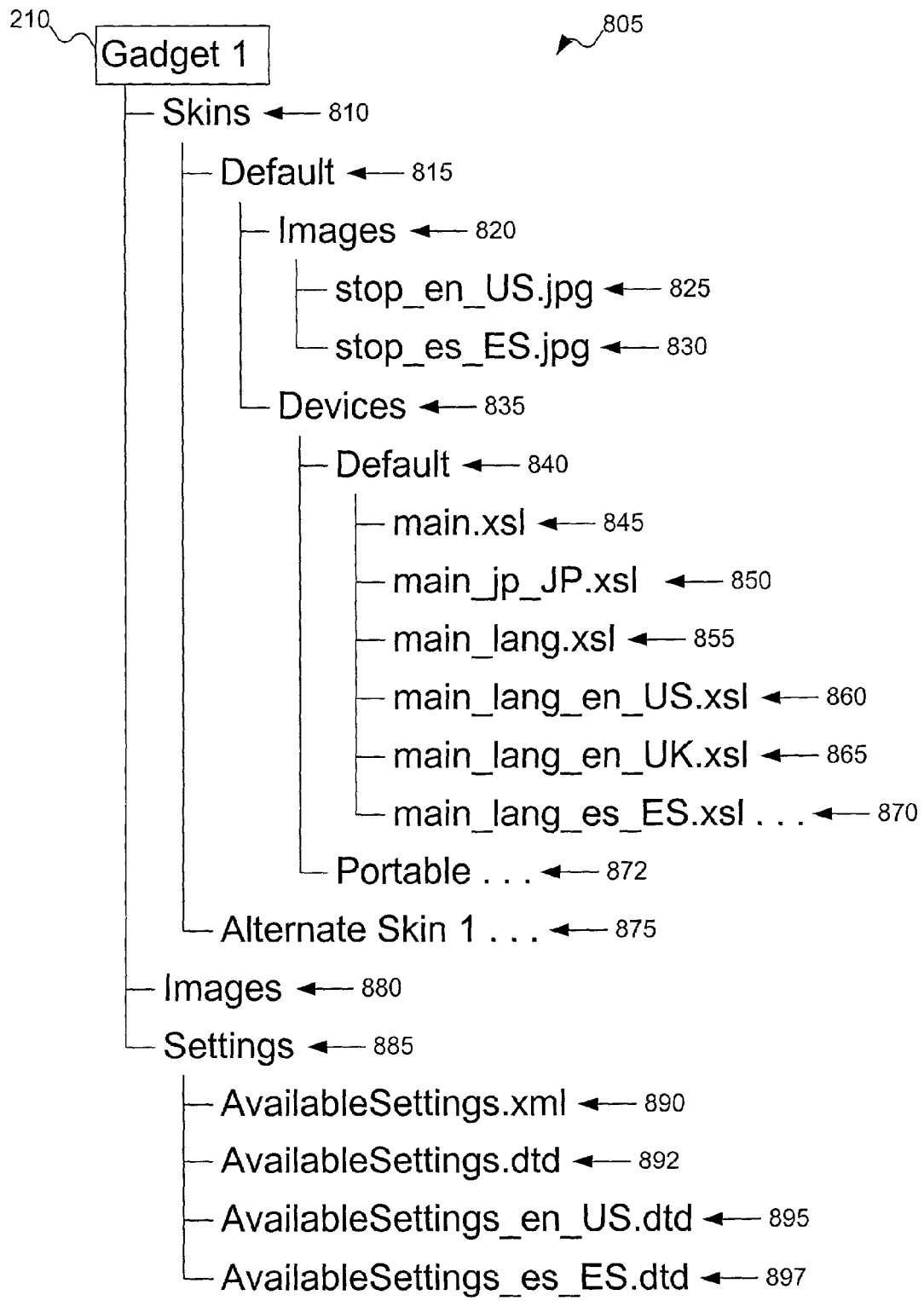
FIG. 8 shows a file hierarchy for the gadget of FIG. 4, according to an embodiment of the invention.
Figure 9A:
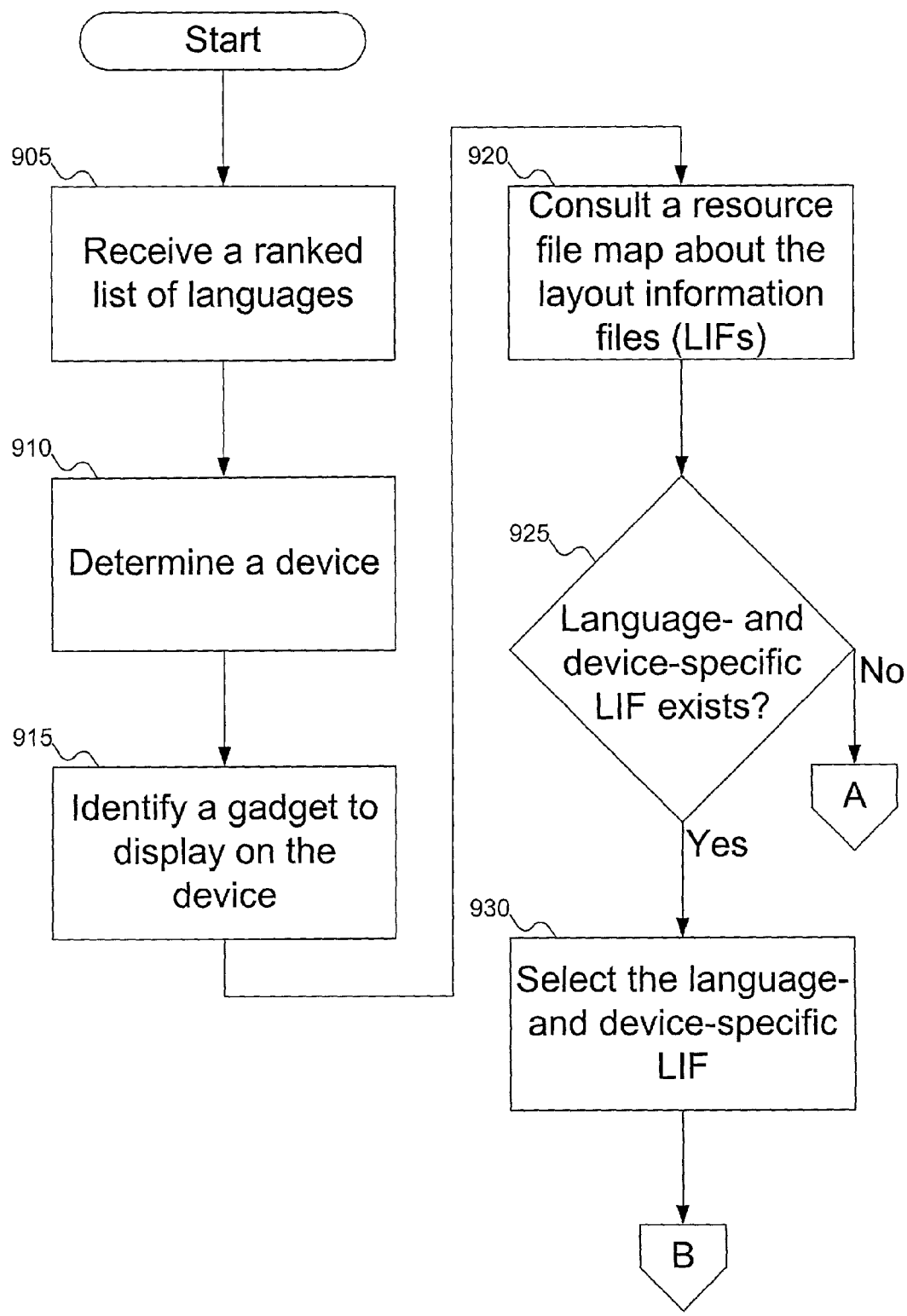
FIGS. 9A-9D show a flowchart for displaying content for a gadget in the system of FIG. 2 in a user's preferred language, according to an embodiment of the invention.
Figure 9B:
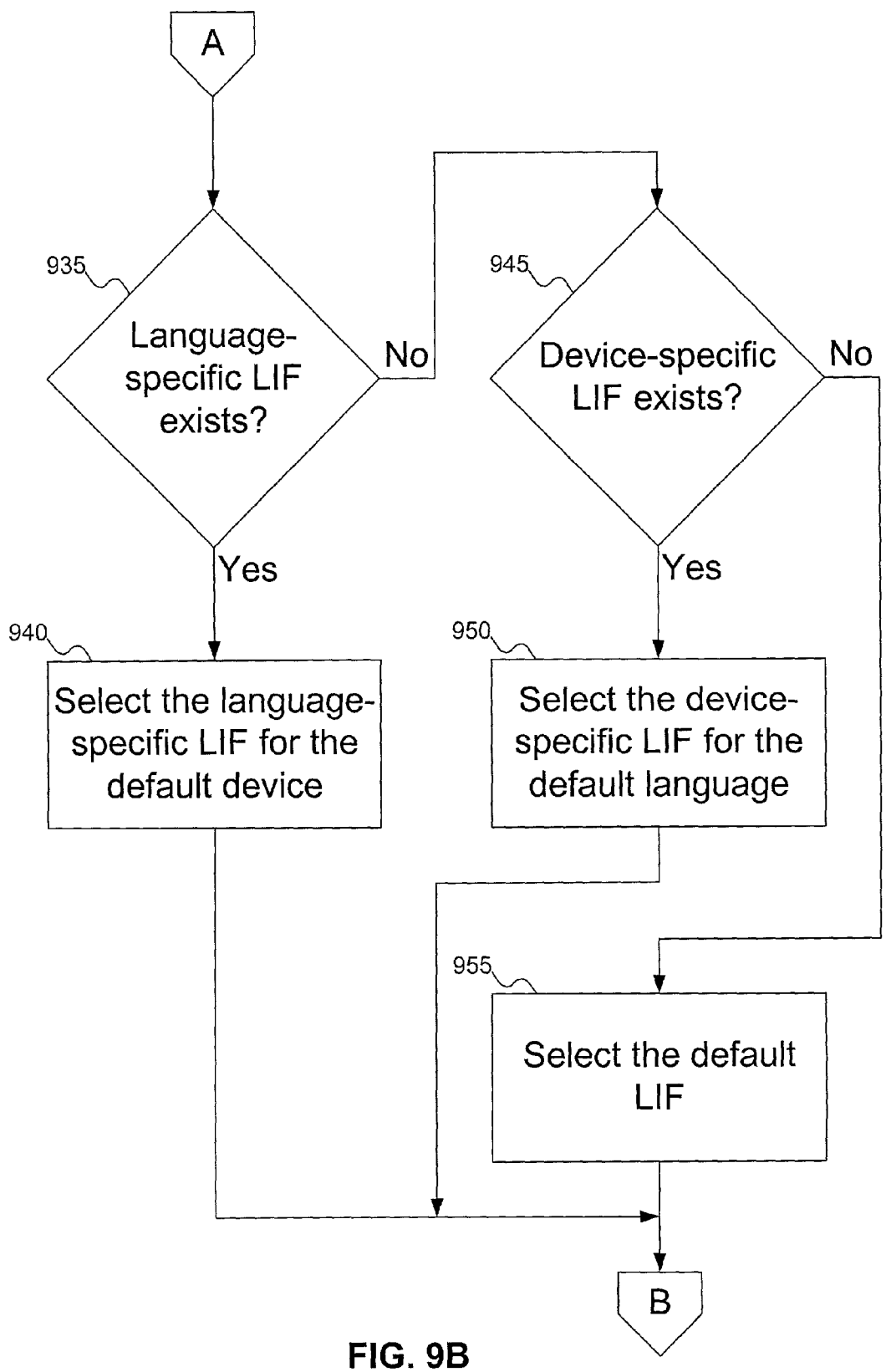
Figure 9C:
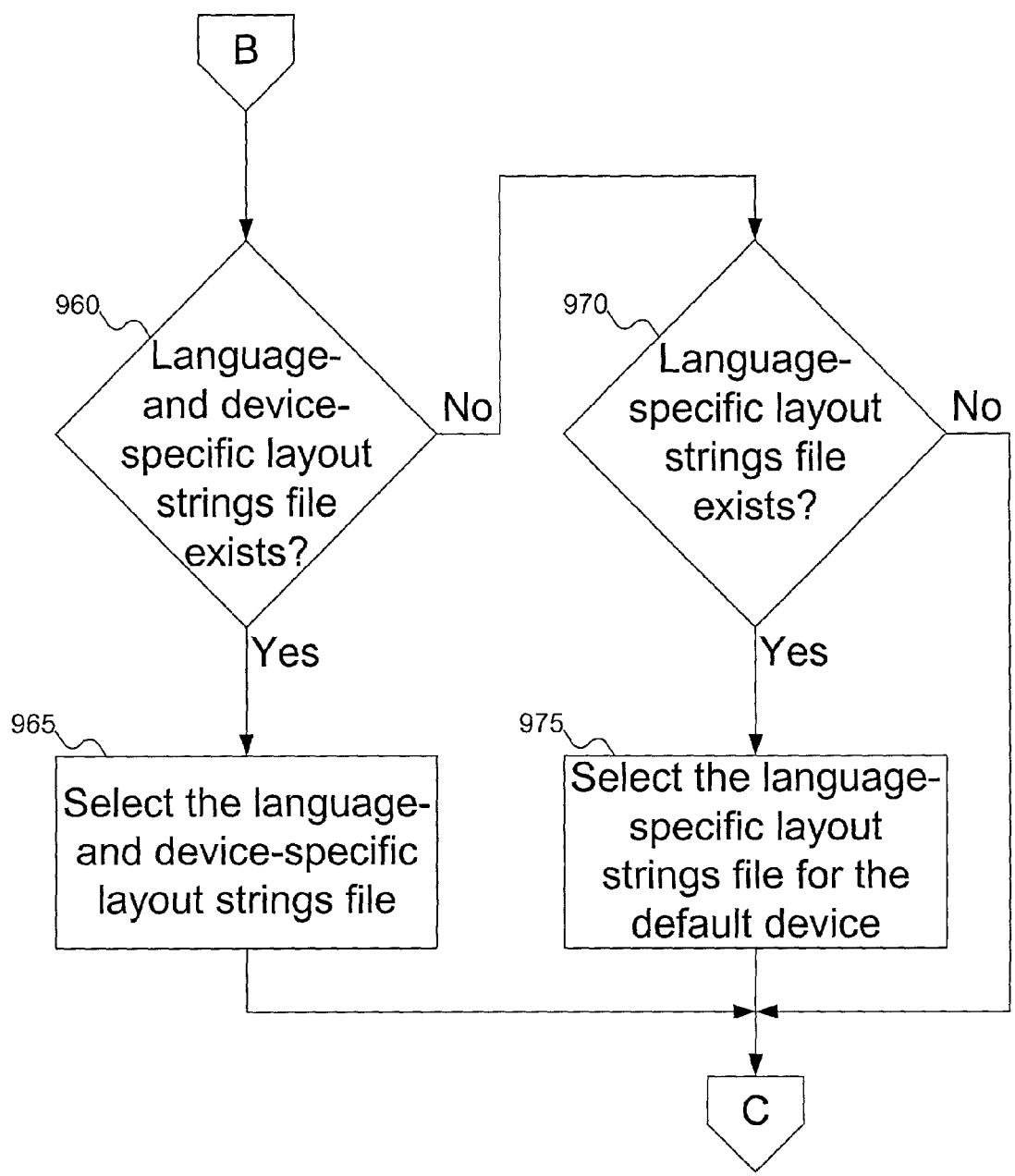
Figure 9D:
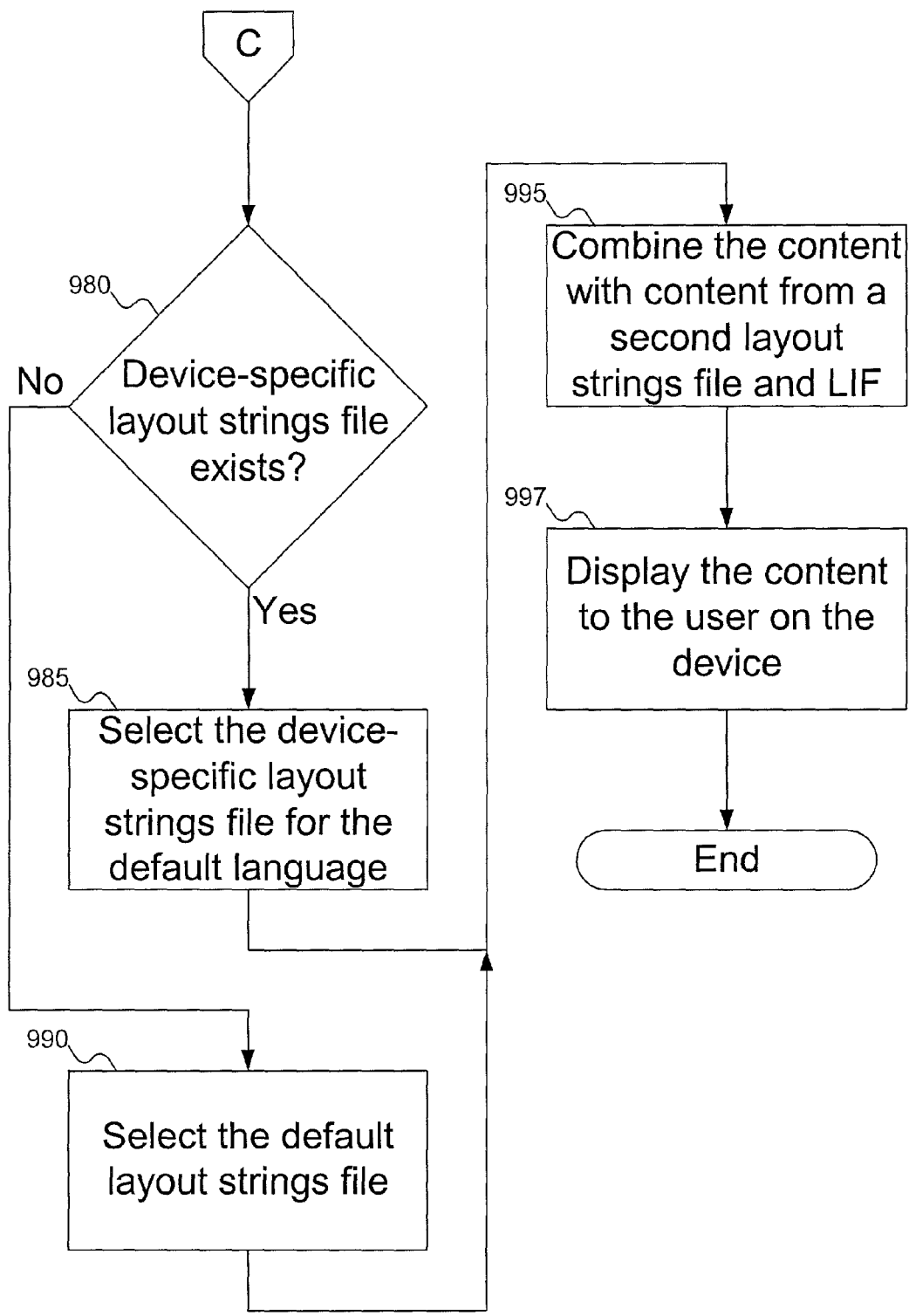

FIG. 8 shows a file hierarchy for the gadget of FIG. 4, according to an embodiment of the invention. In FIG. 8, hierarchy 805 shows the hierarchy of files for gadget 210. Three primary subdirectories of gadget 210 are shown: Skins 810, Images 880, and Settings 885. (A person skilled in the art will recognize that the subdirectories and files in the hierarchy for gadget 210 can be in either lower or upper case.) These are discussed in turn, below.

Skins 810 is the subdirectory storing information about each skin (i.e., LIF) available for the device. Each skin is assigned a name, one of which is Default 815. For example, in FIG. 8, Alternative Skin 1 875 is one alternative skin. Other alternative skins can also be present.

Within each skin, two subdirectories exist. Images 820 stores the images associated with the skin for data presentation. For example, in FIG. 8, two files are shown: stop.jpg (825) and stop_es_ES.jpg (830). These files store the default (English) and Spanish versions of the stop sign (the English version is shown as graphic image 620 of FIG. 6A).

A moment is required to explain the naming convention, first encountered here with reference to Image 820 subdirectory. The default version of a file is named as desired by the content provider. Specific language versions are named by taking the name of the file (less any extension identifying a type for the file) and appending a language code and a country code to the file name. Thus, for example, in file stop_es_ES.jpg (830), the "_es" designates a Spanish layout strings file, whereas the _ES identifies the file as being for Spanish speakers from Spain. The reason both a language code and a country code are used lies in dialect or spelling variations that can exist between countries sharing a (generally) common language. Compare the American spelling of the word "favor" with the British spelling "favour," as an example.

A person skilled in the art will recognize that the language code is important, so that the language of the layout strings file is identified. But a country code can be eliminated in some circumstances without significant (if any) loss of information. For example, although "favour" looks wrong as a spelling to American readers, they still will probably recognize the word. Similarly, the costs of localizing content for Spanish speakers from different countries can be avoided, since most Spanish speakers will recognize documents written in any dialect (up to regional slang variations).

Returning to FIG. 8, Devices 835 subdirectory stores the files for the particular skin on a particular device. For example, Default 840 subdirectory stores the files for the default layout on default devices, whereas Portable 872 stores the files for the default layout on portable devices. Within Default 840 subdirectory are stored the files used to present the content to the user. Main.xsl 845 is the default LIF, describing how the content is to be arranged for display in the gadget using the Default 815 skin. In contrast, main_jp_JP.xsl 850 is a Japanese language LIF: i.e., main_jp_JP.xsl 850 specifies how content is to be arranged for the Japanese language when using the default LIF on a default device.

Main_lang.xsl 855 and its siblings store the layout strings (described above with reference to FIGS. 4-5). That is, main_lang.xsl 855 stores the default layout strings, whereas main_lang_en_US.xsl (860), main_lang_en_UK.xsl (865), and main_lang_es_ES.xsl (870) store the American English, British English, and Spanish layout strings, respectively. A person skilled in the art will recognize there can be other layout string files as well.

Although the layout strings files 855-870 are shown only within Default 840 subdirectory of Default 815 skin, a person skilled in the art will understand that layout strings files, like LIFs, can be layout- and device-dependent. That is, not only can the presentation of the data vary depending on the device, but even the actual content presented can vary as well. In that case, there can be layout strings files in subdirectories for other devices and other skins Nevertheless, in the embodiment shown in FIG. 8 the layout strings files are stored only in Default 840 subdirectory of Default 815 skin, to centralize where the layout strings (found in the layout strings files) are stored. Otherwise, content needs to be changed in several locations, to specialize the content change for different devices and/or skins.

Images 880 subdirectory stores graphic image files that are constant across all skins. For example, pictures that are language- or context-independent can be stored in Images 880 subdirectory.

Finally, settings 885 stores settings that apply to the gadget. Such settings can include, among others, instructions to the user for editing the gadget (since instructions are written, they need to be presented in a language the user understands), definitions as to how the files in hierarchy 805 are to be interpreted, etc. For example, AvailableSettings.xml 890 is shown as an extensible mark-up language (XML) file. XML files include tags and values, but do not explain how the tags and values are to be used AvailableSettings.dtd 892 defines how the tags and values within AvailableSettings.xml (890) is interpreted. Similarly, AvailableSettings_en_US.dtd (895) and AvailableSettings_es_ES.dtd (897) define settings specific for American English and Spanish, respectively. Typically, these settings are configured by an administrator, but in some situations users can also configure gadgets.

FIGS. 9A-9D show a flowchart for displaying content for a gadget in the system of FIG. 2 in a user's preferred language, according to an embodiment of the invention. At step 905 (FIG. 9A), the content provider receives a ranked list of languages from the user. At step 910, the content provider determines a device the user is using. As discussed above, the device can be identified as part of the request for content made by the user, but other techniques can be used to identify the device. For example, the content provider can specifically interrogate the device for its type. At step 915, the content provider identifies a gadget to be displayed as content to the user. At step 920, the content provider consults a resource file map for the gadget, such as map 705 in FIG. 7A, to determine which combinations of devices, layouts, and languages are recognized.

At step 925, the content provider determines if there is a language- and device-specific layout information file for the gadget. If there is, then at step 930 that layout information file is selected. Otherwise, at step 935 (FIG. 9B), the content provider determines if there is a language-specific layout information file for the default device. If there is, then at step 940 the language-specific layout information file for the default device is selected. Otherwise, at step 945, the content provider determines if there is a device-specific layout information file for the default language. If there is, then at step 950 the device-specific layout information file for the default language is selected. Otherwise, at step 955, the layout information file for the default language and default device is selected.

A person skilled in the art will recognize that steps 935-940 and steps 945-950 can be swapped. That is, a layout information file favoring a specific device can be preferred over a layout information file favoring a specific language.

Regardless of which layout information file is selected in steps 925-955, at step 960 (FIG. 9C) the content provider determines if there is a language- and device-dependent layout strings file. If there is, then at step 965 the language- and device-dependent layout strings file is selected. Otherwise, at step 970 the content provider determines if there is a language-dependent layout strings file for the default device. If there is, then at step 975 the language-dependent layout strings file for the default device is selected.

At step 980 (FIG. 9D), the content provider determines if there is a device-dependent layout strings file for the default language. If there is, then at step 985 the device-dependent layout strings file for the default language is selected. Otherwise, at step 990, the layout strings file for the default language and default device is selected.

Regardless of which layout strings file is selected, the layout strings from the selected layout strings file are formatted according to the selected layout information file. As explained at step 995, the layout strings can be combined with layout strings drawn from a second layout strings file and formatted according to a second layout information file. (Recall from FIG. 2 that there can be more than one gadget displayed on a content page.) Finally, at step 997, the content is displayed to the user.

Although the above description focuses on presenting content to a user in a user's preferred language, a person skilled in the art will recognize that the embodiment can be generalized beyond simply language. Language is merely a context for presenting information. Thus, the above description can be generalized to any context or medium in which content be presented.

The above discussion describes the use of numerous files (for example, the use of different files for each layout strings file or each layout information file). But a person skilled in the art will recognize that individual files are not needed to implement the invention. For example, a single layout strings file can be used, the layout strings file divided into sections for different languages. Or a database can be used, with the various "files" being stored as tables within the database. Or a spreadsheet can be used, with each "file" stored as a page in the spreadsheet. In general, a master file can be used to store several sub-files, such as the layout information files and/or the layout strings files, rather than storing each file separately. (There can also be more than one master file, depending on the preferred structure: for example, the master files can be divided by language, each master file holding the files specific to that language.) The specific structure of how the data is stored can be varied in any meaningful way, as long as the functionality described above is available.

A person skilled in the art will recognize that an embodiment of the invention described above can be implemented using a computer. In that case, the method is embodied as instructions that comprise a program. The program can be stored on computer-readable media, such as floppy disks, optical disks (such as compact discs), or fixed disks (such as hard drives). The program can then be executed on a computer to implement the method. A person skilled in the art will also recognize that an embodiment of the invention described above can include a computer-readable modulated carrier signal.

Having illustrated and described the principles of the invention in a preferred embodiment thereof, it should be readily apparent to those skilled in the art that the invention can be modified in arrangement and detail without departing from such principles. All modifications coming within the spirit and scope of the accompanying claims are claimed.

The invention claimed is:

1. An apparatus for presenting content to a user, comprising:
   a device to concurrently display at least a first gadget and a second gadget to the user;
   a plurality of layout strings files, wherein each layout string file comprises at least one layout string, each layout string comprising a language-dependent text string suitable to be displayed on a gadget;
   a plurality of layout information files (LIFs), wherein each LIF describes how at least one particular layout string is to be displayed on a particular gadget for a unique combination of a language and a device, the plurality of LIFs comprising:
      a first LIF describing how at least a first layout string is to be displayed on the first gadget based on a combination of the device and a first language; and
      a second LIF describing how at least a second layout string is to be displayed on the second gadget based on a combination of the device and a second language, wherein the second language and the first language are different; and
   a computer to store the layout strings files and the layout information files.

2. An apparatus according to claim 1, wherein each of the layout strings files stores each corresponding layout string in one of a plurality of languages.

3. An apparatus according to claim 2, further comprising:
   a resource file map to store at least two combinations of a layout information file and languages in which the layout strings files store the layout strings;
   a ranked list of languages specifying a plurality of languages preferred by the user and an order based on the user's preferences; and
   a selector to select one of the plurality of layout information files and one layout strings file based on the ranked list of languages and the resource file map.

4. An apparatus according to claim 3, wherein each layout information file defines how a particular layout string is displayed in a different language.

5. An apparatus according to claim 3, wherein:
   each layout information file defines how a particular layout string is displayed in a different language on a different device; and
   the resource file map stores combinations of layout information files, languages in which the layout strings files store the layout strings, and identities of devices for display of the information.

6. An apparatus according to claim 3, wherein:
   each layout information file defines how a particular layout string is displayed on a different device; and
   the resource file map stores combinations of the layout information files, languages in which the layout strings files store the layout strings, and identities of devices for display of the information.

7. An apparatus according to claim 3, wherein the resource file map stores information about context-dependent data not stored in the layout information files or the layout strings files.

8. An apparatus according to claim 2, wherein each layout strings file includes a layout string in one language.

9. An apparatus according to claim 8, wherein at least one layout information file specifies a placement for the layout string on a default device.

10. An apparatus according to claim 2, wherein each layout strings file includes a language image in the language.

11. An apparatus according to claim 10, wherein at least one layout information file specifies a placement for the language image on a default device.

12. An apparatus according to claim 2, further comprising means for selecting one of the plurality of layout information files and one layout strings file based on a ranked list of languages specifying a plurality of languages preferred by the user and an order based on the user's preferences.

13. A computer-implemented method for displaying content to a user, comprising:
   locating a first layout information file (LIF) and a second LIF from a plurality of layout information files, the first LIF specifying how a first layout string is to be presented to the user for a unique combination of a first language and a device, and the second LIF specifying how a second layout string is to be presented to the user for a unique combination of a second language and the device, wherein the first and second languages are different;
   locating a first layout strings file and a second layout strings file from a plurality of layout strings files, the first layout strings file storing the first layout string, and the second layout strings file storing the second layout string;
   presenting the first layout string to the user according to the first LIF; and
   presenting the second layout string to the user according to the second LIF, wherein the first and second layout strings are presented concurrently.

14. A method according to claim 13, wherein:
   locating a first layout information file includes locating a layout information file specifying how first content and the first layout string are to be presented to the user;
   the method further comprises obtaining the first content from a first content provider; and
   presenting the first layout string to the user includes presenting the content and the first layout string to the user according to the first layout information file.

15. A method according to claim 14, wherein locating a first layout strings file and a second layout strings file from a plurality of layout strings files includes locating the one of the plurality of layout strings files storing the first layout string in a selected language.

16. A method according to claim 15, wherein locating a first LIF and a second LIF from a plurality of layout information files includes locating a layout information file dependent on the selected language specifying how the first content is to be presented to the user.

17. A computer implemented method according to claim 15, the method further comprising:
receiving a ranked list of languages from the user, the ranked list comprising a plurality of languages in an order based on preferences of the user;
accessing a resource file map listing recognized combinations of layout information files and languages in which the layout strings file store the layout string; and
identifying the selected language from the resource file map based on the ranked list of languages.

18. A method according to claim 17, wherein identifying the selected language includes identifying a highest-ranked language from the ranked list of languages such that one of the plurality of layout information files and the one of the plurality of layout strings files exist for the highest-ranked language.

19. A method according to claim 18, wherein:
the method further comprises determining a device on which to display the content to the user;
accessing a resource file map includes accessing a resource file map listing all combinations of layout information files, languages, and devices; and
identifying the selected language includes identifying the selected language from the resource file map based on the ranked list of languages and the device.

20. A method according to claim 19, wherein locating a first LIF from a plurality of layout information files includes locating a default layout information file specifying how the first content is to be presented to the user if the resource file map does not specify a combination including a particular layout information file and at least one of the device or one of the languages in the ranked list of languages.

21. A method according to claim 18, wherein locating a first LIF from a plurality of layout information files includes locating a default layout information file specifying how the first content is to be presented to the user if the resource file map does not specify a combination including a particular layout information file and one of the languages in the ranked list of languages.

22. A method according to claim 17, wherein:
accessing a resource file map includes accessing a resource file map storing information about other context-dependent data; and
presenting the first content and the first layout string to the user includes presenting the other context-dependent data to the user according to the first layout information file.

23. A method according to claim 14, further comprising determining a device on which to display the first content to the user.

24. A method according to claim 23, wherein locating a first layout information file includes locating the layout information file specifying how the first content is to be presented to the user on the device.

25. A method according to claim 23, wherein locating the one of the plurality of layout strings files further includes locating the one of the plurality of the layout strings files storing device-dependent layout strings.

26. A method according to claim 23, wherein presenting the first content and the first layout string includes presenting the first content and the first layout string to the user on the device according to the first layout information file.

27. A method according to claim 14, wherein:
locating a second layout information file includes locating a second layout information file specifying how second content and the second layout string are to be presented to the user;
the method further comprises obtaining the second content from a second content provider; and
presenting the second layout string to the user includes presenting the content and the second layout string to the user according to the second layout information file.

28. A method according to claim 27, wherein the first and second content providers are the same content provider.

29. One or more computer-readable media containing a program to display content to a user, comprising:
location software to locate a first layout information file (LIF) and a second LIF from a plurality of layout information files, the first LIF specifying how a first layout string is to be presented to the user for a unique combination of a first language and a device, and the second LIF specifying how a second layout string is to be presented to the user for a unique combination of a second language and the device, wherein the first and second languages are different;
location software to locate a first layout strings file and a second layout strings file from a plurality of layout strings files, the first layout strings file storing the first layout string, and the second layout strings file storing the second layout string; and
presentation software to concurrently present the first and second layout strings to the user according to the first and second layout information files, respectively.

30. One or more computer-readable media containing a program according to claim 29, wherein:
the location software to locate a first layout information file includes location software to locate a layout information file specifying how first content and the first layout string are to be presented to the user;
the program further comprises obtaining software to obtain the first content from a first content provider; and
the presentation software to present the first layout string to the user includes presentation software to present the first content and the first layout string to the user according to the first layout information file.

31. One or more computer-readable media containing a program according to claim 30, wherein the location software includes location software to locate the one of the plurality of layout strings files storing the first layout string in a selected language.

32. One or more computer-readable media containing a program according to claim 31, wherein the location software includes location software to locate a layout information file from a plurality of layout information files dependent on the selected language specifying how the first content is to be presented to the user.

33. One or more computer-readable media containing a program according to claim 31, the program further comprising:
reception software to receive a ranked list of languages from the user, the ranked list comprising a plurality of languages in an order based on preferences of the user;

accessing software to access a resource file map listing recognized combinations of layout information files and languages in which the layout strings file store the layout string; and identification software to identify the selected language from the resource file map based on the ranked list of languages.

34. One or more computer-readable media containing a program according to claim 29, wherein the identification software includes identification software to identify a highest-ranked language from the ranked list of languages such that one of the plurality of layout information files and the one of the plurality of layout strings files exist for the highest-ranked language.

35. One or more computer-readable media containing a program according to claim 34, wherein the locating software includes location software to locate a default layout information file specifying how the content is to be presented to the user if the resource file map does not specify a combination including a particular layout information file and one of the languages in the ranked list of languages.

36. An apparatus for presenting content to a user, comprising:
  a device to concurrently display at least a first gadget and a second gadget to the user;
  a file storing a plurality of layout strings sub-files and a plurality of layout information sub-files to describe how content and a layout string are displayed for a unique combination of a language and a device, the plurality of layout information sub-files comprising:
    a first layout information sub-file describing how at least a first layout string is to be displayed on the first gadget based on a combination of the device and a first language; and
    a second layout information sub-file describing how at least a second layout string is to be displayed on the second gadget based on a combination of the device and a second language, wherein the second language and the first language are different;
  a resource file map to store at least two combinations of the layout information sub-file and languages in which the layout strings sub-files store the layout strings;
  a computer to store the file and the resource file map;
  a ranked list of languages specifying a plurality of languages preferred by the user and an order based on the user's preferences; and
  a selector to select one of the plurality of layout information sub-files and one layout strings sub-file based on the ranked list of languages and the resource file map.

37. One or more computer-readable media containing a gadget file structure comprising:
  a first directory storing at least two layout strings files, each layout strings file storing a layout string in a language;
  a second directory storing a first layout information file for a first combination of a first language and a device, the first layout information file designed to be combined with one of the layout strings files and a first content to display a first layout string and the first content to a user in the first language on the device;
  a third directory storing a second layout information file for a second combination of a second language and the device, the second layout information file designed to be combined with one of the layout strings files and a second content to display a second layout string and the second content to the user in the second language on the device, wherein the first and second contents are displayed concurrently, and wherein the first and second languages are different; and
  a resource file map identifying valid combinations of layout information files and languages in which the layout strings files store layout strings for the device.

38. One or more computer-readable media containing a gadget file structure according to claim 37, wherein the resource file map further identifies valid combinations of layout information files in a fourth directory and languages in which the layout strings files store layout strings for a second device.

* * * * *